Patented Apr. 18, 1950

2,504,158

UNITED STATES PATENT OFFICE 2,504,158

HYDROCARBON CONVERSION WITH ECCLES KAOLIN

Hubert A. Shabaker, Media, Pa., assignor to Houdry Process Corporation, Wilmington, Del., a corporation of Delaware No Drawing. Application February 26, 1947, Serial No. 731,059

5 Claims. (Cl. 196—52)

The present invention relates to processes of hydrocarbon conversion employing cracking catalysts including such processes in which hydrocarbons of lower boiling point and lower molecular weight are produced from heavier petroleum oils of higher boiling point as well as processes wherein petroleum hydrocarbons boiling in the range of naphtha or gasoline are treated with cracking catalysts under cracking conditions to effect principally improvement in quality of the product, such as increased anti-knock value, improvement in lead susceptibility, desulphurization, or increase in olefinicity.

Although a large number of substances of natural and synthetic origin have been proposed in the prior art for use in cracking and reforming of hydrocarbons, the cracking catalysts in commercial use are principally synthetic gels comprising composites of silica and alumina and special types of clay, constituted by the sub-bentonites of the montmorillonite family, which clays are activated by acid-treatment to produce catalysts of required high activity.

I have discovered that a certain type of kaolin clays hereinafter identified can be beneficially employed as catalysts in hydrocarbon conversion processes, obtaining under normal catalytic cracking conditions substantial yields of desired hydrocarbon conversion products, particularly gasoline having the characteristic high octane value and other desirable qualities of catalytically cracked gasoline produced from the present commercial catalysts.

The kaolin clays employed in accordance with the invention provide not only a cheaper material for catalyst preparation, but offer further economics because of simplicity of catalyst preparation therefrom, without necessitating resort to expensive treatment for activation. In addition the higher density and higher heat stability of these catalysts offer other important advantages over commercial acid-activated clay catalysts, as will hereinafter appear.

The clays employed have kaolinite as the principal clay mineral constituent present therein and contain on the dry basis (105° C.) about 43 to 47% by weight of silica and about 41 to 35% by weight of alumina. The remaining constituents which may include compounds of iron, calcium, magnesium, titanium and alkali metal compounds, constitute less than about 2.5% of the total clay composition, the remainder of the composition consisting of volatiles (chiefly water) lost on ignition. These kaolin clays are characterized by the unique property of exhibiting when calcined in the raw state a stable catalytic activity, such that yields of over 20% gasoline (based on volume of charge) are obtained on cracking of light gas oil under the conditions of the test method hereinafter described. These kaolin clays are distinguished from the known catalytic clays by the effect of acid-treatment on the raw clay. Whereas the usual clays employed in the preparation of cracking catalysts, such as the subbentonite clays, display after calcination in the raw state only fairly low cracking activity, they can be brought to about three times and often to four or more times the level of their original raw activity by conventional acid-activation; the kaolin clays of the present invention show but slight improvement in activity on such acid-treatment, there being generally in the order of less than 25 to 30% increase over the catalytic activity displayed in the raw state. Furthermore, as distinguished from the other clays compared, the extent or severity of acid-treatment has no marked effect, substantially optimum increase in activity being obtained with small amounts of fairly dilute acid, which is not further enhanced materially by higher concentrations and greater quantities of acid. Other unique properties of the kaolin clays of the present invention will appear from the description below.

One source of the kaolin clay described is from a formation found on the property known as the "Eccles Estate" and adjoining properties situated in Putnam County, Florida; including sections in the vicinities of Hawthorne and near Red Water Lake. This deposit will be hereinafter referred to as "Eccles" kaolin.

The Eccles kaolin bed, in its upper layers particularly, is admixed with a large quantity of sand, which can be readily and largely removed by washing and settling. Excellent catalysts, however, have been prepared from Eccles kaolin still containing in the order of about 20% by weight of sand.

Eccles kaolin apparently contains kaolinite as its principal clay mineral constituent. Heated to a temperature of about 1050° F. for 2 hours, the entire lattice is destroyed, yielding a nearly amorphous product as indicated by X-ray examination.

Different samples of the clay analyzed had the following general composition based on clay weight at 105° C. dried basis.

TABLE 1

|  | 1<br>Low Sand Sample | 2<br>Sample Containing 15–18% sand | 3<br>Same as 2 Calculated on Sand-Free Basis |
|---|---|---|---|
|  | Per cent | Per cent | Per cent |
| Ign. Loss at 1600° F | 13.3 | 10.36 | 12.00 |
| SiO₂ | 46.6 | 59.0 | 43.0 |
| Al₂O₃ | 41.1 | 29.3 | 34.9 |
| Fe₂O₃ | 0.42 | 1.25 | 1.49 |
| CaO | 0.48 | 0.21 | 0.28 |
| MgO | 0.25 | 0.19 | 0.23 |
| Na₂O | undet. | 0.06 | 0.07 |
| TiO₂ | undet. | 0.52 | 0.62 |

Most natural hydrosilicates in the raw state, including typical kaolin clays as well as raw clays of the montmorillonite type, are relatively inactive, giving at the usual cracking temperatures products which do not essentially differ in quality or quantity from products obtained by mere thermal or non-catalytic decomposition of a hydrocarbon charge stock at the same temperature. On the other hand, Eccles kaolin demonstrates catalytic properties without necessitating resort to special treatment for activation and can be readily utilized as a valuable cracking catalyst.

The gasoline activity and other performance characteristics of cracking catalysts can be determined and compared by test on a standard petroleum fraction. One such test in common use is that known as the "CAT-A" method, described in an article by J. Alexander and H. G. Shimp in National Petroleum News, Technical Section, August 2, 1944; at p. R–537. In accordance with the described test, a standard light East Texas gas oil is cracked at 800° F. and atmospheric pressure at a liquid space rate per hour of 1.5 during a period of ten minutes. The yield of motor gasoline (410° F. cut point) distilled from the liquid products is measured and the activity of the catalyst designated in terms of the volume per cent of such gasoline yield to the volume of oil charged. The "coke" deposited on the catalyst is determined by conversion to $CO_2$ and expressed in weight per cent of charge. The gravity (referred to air) of the gaseous by-products is also determined and the weight per cent of gas calculated from the measured volume and gravity. Designations of catalytic activity in the present specification have reference, unless otherwise indicated, to that determined by the described method.

Before using the described kaolin catalyst in a hydrocarbon conversion process it is preferred to bring the same to stable activity by heat treatment. The heat treatment of the Eccles kaolin or similar kaolin clays may be effected by subjecting the raw clay to a temperature approximate to the catalytic cracking range or above. Generally about one or two hours at about 700 to 1400° F. will be sufficient for the purpose. Longer periods of treatment apparently have no adverse effect. The temperature, however, should not be sufficiently high to cause sintering or surface fusion of the clay, such as may occur at about 1800° F. or above.

The kaolin clay may be subjected to the prescribed heat treatment in any desired form, such as finely divided powder, lumps, or uniformly shaped masses, but it is preferred to carry out the treatment on the clay already in the shape or condition in which it is to be employed as catalyst in the hydrocarbon conversion process. Thus, for use in types of operations employing uniformly shaped aggregates of catalyst such as pellets, the raw kaolin may be admixed with water to proper consistency and extruded as strands which are cut to desired lengths. The pellets thus formed can be simply dried and calcined as above indicated and are ready for use as catalysts. Pellets thus obtained have an apparent bulk density of over 0.85 to about 1.0 or above (kg./L), which is essentially higher than that of acid-activated montmorillonite clay catalysts or those of synthetic silica-alumina in pellet form.

Although it is preferred to subject the kaolin clay to heat treatment in a separate apparatus prior to use, substantially similar effects may be obtained directly in the system employed for the hydrocarbon conversion operations, wherein for instance the raw clay in desired form is contacted alternately with hydrocarbon vapors at catalytic cracking temperatures and then with oxidizing gases for regeneration at temperatures of about 800° F. and above.

*Example I*

A sample of raw Eccles kaolin, containing about 15 to 18% sand, was ground and admixed with about 28% of its dry weight of water. The mix was extruded into strands which were cut into 4 mm. pellets. These pellets were dried and then calcined in air at 1050° F. for two hours.

Employed in the cracking of the standard light gas oil under the conditions of the CAT-A method there was obtained a quantity of gasoline corresponding to 21% of the volume of oil changed, with the deposition of 2.7% by weight of coke and the formation of 5.6% by weight of gas.

*Example II*

Pellets were prepared in a manner similar to that of the preceding example from Eccles kaolin which had previously been washed to about a 3% content of sand. The dried pellets heat treated at 1050° F. for two hours, obtained a yield of catalytically cracked gasoline amounting to 24.3% by volume of the oil charged, with the deposition of 2.7% by weight of coke and the formation of 5.5% by weight of gas.

*Example III*

Catalyst prepared from the same batch of pellets as Example I after drying were treated at 1400° F. for ten hours in the presence of 5% steam. These pellets used in cracking a light gas oil under the same conditions as above set forth gave a yield of 26.6% of gasoline by volume of charge with 2.4% by weight of coke and 5.5% by weight of gas.

*Example IV*

Another batch of kaolin clay from a different location on the Eccles estate, having substantially the composition given in column 1 of Table 1, pelleted and calcined at 1050° F. for 2 hours, obtained a yield of 22.1% by volume of gasoline on cracking light gas oil under the conditions of the "CAT-A" method.

Although Eccles kaolin, and other kaolin clays of the invention, possess a fairly stable catalytic activity, in the order of about 21% to over 27% gasoline yield, particularly after heat treatment of the raw clay, significant increase in catalytic activity can be effected by preliminary acid treatment of the raw clay prior to heat treatment or use. In the acid-treatment of acid-activable montmorillonite clays, as the severity of acid-treatment is increased, there is obtained a progressive increase in catalytic activity as measured in terms of higher gasoline yields until a maximum level is reached; as a result of acid activation the gasoline/coke ratios of the clay are correspondingly improved. Treatment of Eccles kaolin with mineral acid, such as hydrochloric or sulfuric acid, although not to the extent observed with so-called acid-activable clays does effect some increase in catalytic activity for catalysts calcined in air alone or in the presence of 5% by weight of steam, but with a more or less proportional increase in the yield of normally gaseous cracked products and coke deposited. For instance, the raw Eccles kaolin treated with 20% aqueous sulfuric acid, 40 parts by weight acid on anhydrous basis to dry clay weight (.40 ratio), at 200° F. for 8 hours, and another sample treated with 25% aqueous sulfuric (.50 ratio, dry basis) for 4 hours each showed a higher gasoline activity by the "CAT-A" method than a non-acid treated sample, both calcined in air. Comparative activity tests for variously treated Eccles kaolin are given in the following table. The raw "Eccles" kaolin employed contained about 16% by weight of sand except for the example marked with an asterisk which contained about 3% sand.

TABLE 2

| Acid Treat, $H_2SO_4$ at 200° F. | Heat Treat | Gasoline, Volume Per Cent | Coke, Weight Per Cent | Gas, Weight Per Cent | Gas, Grav. |
|---|---|---|---|---|---|
| None | 1050° F.—2 hrs.—air | 21.0 | 2.7 | 5.6 | 0.82 |
| 20%—0.40 ratio—8 hrs | do | 28.4 | 2.2 | 7.6 | 1.32 |
| 25%*—0.50 ratio—4 hrs | do | 29.6 | 2.4 | 7.1 | 1.30 |
| 5%—0.10 ratio—8 hrs | do | 28.6 | 2.3 | 6.3 | 1.27 |
| 20%—0.40 ratio—4 hrs | do | 28.3 | 2.2 | 5.4 | 1.34 |
| Do | 1400° F.—10 hrs.—5% steam | 32.6 | 1.9 | 4.5 | 1.33 |
| 10%—0.40 ratio—2 hrs | do | 33.2 | 1.9 | 5.4 | 1.35 |

As seen from the above table, with Eccles kaolin the severity or extent of the acid treatment has no marked effect on catalytic properties, contrary to the typical behavior exhibited by acid-activable montmorillonite clays. Likewise the temperature of acid treatment is less significant in the case of Eccles kaolin; temperatures as low as room temperatures and up to the boiling point of the acid or acid-clay slurry may be employed, although elevated temperatures are preferable in shortening the time for substantially the same effect of the treatment.

In using the contact masses prepared from Eccles kaolin and similar kaolin clays as catalysts in hydrocarbon conversion processes, the ordinary conditions employed with present commercial catalysts can be followed as to time, temperature, etc. As an example of a fixed catalyst bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such as to subject the oil to substantially equivalent conditions including contact time and ratios of oil to catalyst as those set out above in connection with the fixed bed process. The catalyst during its cycle is passed through a separate regeneration zone.

Virgin or cracked gasoline or naphtha fractions may be improved in accordance with the invention by treating the same under conditions similar to those employed in cracking. In all of these processes, the catalyst after use is regenerated by contacting it with air or other oxygen-containing gas to burn off carbonaceous deposits.

Because of the comparatively high temperatures to which these kaolins can be subjected without surface fusion and because of the excellent heat capacity incident to the high density of these catalysts, however, the usual operating conditions can be safely stepped up, since the larger quantity of coke laid down under the more severe operating conditions can be adequately handled at increased regeneration temperature without untoward effect on the catalyst.

Obviously many modifications and variations of the invention as hereinbefore set forth may be made without departing from the spirit and scope thereof and therefore only such limitations should be imposed as are indicated in the appended claims.

I claim as my invention:

1. In methods comprising catalytic conversion of hydrocarbons in contact with a cracking catalyst, the improvement which comprises contacting said hydrocarbons with Eccles kaolin under catalytic cracking conditions, said Eccles kaolin containing on a dry weight basis about 43 to 47% $SiO_2$ and 41 to 35% $Al_2O_3$, the remaining constituents exclusive of volatiles constituting less than 2.5% of the total clay composition.

2. The method of claim 1 in which the Eccles kaolin has been activated by treatment with diluted mineral acid followed by calcination of the acid-treated kaolin.

3. The method of converting hydrocarbons of higher boiling point into products boiling in the range of gasoline which comprises contacting a charge stock containing such higher boiling hydrocarbons with Eccles kaolin under catalytic cracking conditions, said Eccles kaolin containing on a dry weight basis about 43 to 47% $SiO_2$ and 41 to 35% $Al_2O_3$, the remaining constituents exclusive of volatiles constituting less than 2.5% of the total clay composition.

4. The method of claim 3 in which the Eccles kaolin is in the form of calcined pellets.

5. The method of claim 3 in which the Eccles kaolin has been activated by treatment with diluted mineral acid followed by calcination of the acid-treated kaolin.

HUBERT A. SHABAKER.

REFERENCES CITED

The following references are of record in the file of this patent:

UNITED STATES PATENTS

| Number | Name | Date |
|---|---|---|
| 2,305,220 | Legg | Dec. 15, 1942 |
| 2,369,001 | Ahlberg et al. | Feb. 6, 1945 |

FOREIGN PATENTS

| Number | Country | Date |
|---|---|---|
| 490,853 | Great Britain | Aug. 23, 1938 |

OTHER REFERENCES

"Ceramic Products Cyclopedia," 5th edition, 1930–1931, published by Industrial Publications, Inc., 59 E. Van Buren Street, Chicago, Illinois. pages 454–456.